United States Patent [19]
Yoshida et al.

[11] Patent Number: 5,235,875
[45] Date of Patent: Aug. 17, 1993

[54] GEAR SHIFT CONTROL SYSTEM OF AN AUTOMATIC TRANSMISSION

[75] Inventors: Shigeyuki Yoshida; Katsuhiro Hatta; Toshitaka Naruse, all of Kyoto, Japan

[73] Assignee: Mitsubishi Jidosha Kogyo Kabushiki Kaisha, Tokyo, Japan

[21] Appl. No.: 834,832

[22] Filed: Feb. 13, 1992

[30] Foreign Application Priority Data

Feb. 13, 1991 [JP] Japan .................. 3-019904

[51] Int. Cl.⁵ ............................... B60K 41/06
[52] U.S. Cl. ............................ 74/866; 364/424.1
[58] Field of Search .............. 74/866; 364/424.1

[56] References Cited

U.S. PATENT DOCUMENTS

| | | | |
|---|---|---|---|
| 4,922,424 | 5/1990 | Hiramatsu | 74/866 X |
| 5,076,116 | 12/1991 | Sasaki | 74/866 OR |
| 5,079,972 | 1/1992 | Iizuka | 74/866 OR |
| 5,103,398 | 4/1992 | Akiyama | 74/866 X |
| 5,113,721 | 5/1992 | Polly | 74/866 OR |

Primary Examiner—Leslie A. Braun
Assistant Examiner—Daniel Wittels

[57] ABSTRACT

A gear shift control system according to this invention includes a throttle opening sensor, a vehicle speed sensor and a controller for delivering a shift command signal to an automatic transmission. The controller is previously stored with shift lines, which divide the respective regions of gear-shift stages, on the basis of the throttle opening and the vehicle speed. The controller delivers the shift command signal to the transmission when any of the shift lines is crossed by a shift point which is defined by the throttle opening and the vehicle speed. Taking account of the changing rate of the throttle opening, the past throttle opening, and the acceleration of the vehicle, however, the controller calculates a decision value which is indicative of the running state of the vehicle, on the basis of the fuzzy theory. When the decision value exceeds a predetermined value, the controller corrects the shift lines depending on the running state.

17 Claims, 7 Drawing Sheets

GEAR SHIFT CONTROL SYSTEM OF AN AUTOMATIC TRANSMISSION

BACKGROUND OF THE INVENTION

1. Field of the Invention

This invention relates to a system for controlling the gear shift of an automatic transmission for a vehicle, and more particularly, to a system for controlling the gear shift of the automatic transmission in consideration of the conditions of a road on which the vehicle runs, the driving conditions of the vehicle, or a driver's mental state.

2. Description of the Related Art

An automatic transmission of a vehicle has a plurality of gear-shift stages to be selected for the forward drive of the vehicle. In the automatic transmission of this type, one gear-shift stage is automatically selected in accordance with the running conditions of the vehicle, that is, vehicle speed and engine throttle opening.

The automatic transmission is combined with a system for controlling the gear shift operation. This gear shift control system is previously provided with a plurality of up-shift lines and down-shift lines corresponding thereto. Based on the vehicle speed and the throttle opening, the up- and down-shift lines individually divide gear-shift stage regions on the low- and high-speed stages. These shift lines are used to select the gear-shift stage of the automatic transmission. In other words, whether the gear-shift stage of the automatic transmission should be shifted up or down is determined by the up- and down-shift lines.

More specifically, when the representative point of the driving conditions, that is, the shift point, which is determined by the actual vehicle speed and actual throttle opening, is moved across a certain down-shift line from a higher-speed stage region thereof to a lower-speed stage region, the gear shift control system delivers a shift command signal to the automatic transmission such that the current gear-shift stage should be shifted down to a gear-shift stage on the low-speed side defined by the down-shift line concerned. As a result, the gear-shift stage of the transmission is switched to a lower-speed stage.

When the shift point is moved across a certain up-shift line from a lower-speed stage thereof to a higher-speed stage region, the gear shift control system delivers a command signal for shift-up to the automatic transmission. As a result, the gear-shift stage of the transmission is switched to a higher-speed stage.

Conventionally, the up- and down-shift lines are determined by the vehicle speed and the throttle opening only. Depending on the running state of the vehicle, therefore, the gear-shift stage of the automatic transmission may be unexpectedly shifted or repeatedly shifted up and down.

Let us suppose a situation, for example, such that the accelerator pedal of the vehicle is released from the depression by a driver when the vehicle is on the point of entering a curve while ascending a slope, or when the driver sees an obstacle before his or her eyes, such as a wild plunge of a pedestrian or another vehicle, while the vehicle is running along the streets of a town. In such a situation, one of the up-shift lines may possibly be crossed by the shift point, which is determined by the actual vehicle speed and actual throttle opening, so that the automatic transmission is immediately shifted up to a gear-shift stage on a higher-speed side. Thereafter, when the driver depresses the accelerator pedal again, seeing that the vehicle has reached the end of the curve, or that the obstacle is removed, one of the down-shift lines is then crossed by the shift point, so that the automatic transmission is shifted down to a lower-speed stage. Thus, while the vehicle is running in the aforesaid state, the automatic transmission is repeatedly and alternately shifted up and down, although its shifting operation is practically unnecessary.

The above-described situation occurs while the vehicle is running at a relatively low speed. In some cases, however, the automatic transmission may repeat undesired shifting operations even while the vehicle is running at a relatively high speed. Let us suppose a situation, for example, such that the driver slowly and slightly deepens the depression of the accelerator pedal when the vehicle approaches a gentle ascending slope while running at a relatively high speed. Conventionally, in such a case, the additional depression of the accelerator pedal causes the shift point to cross one of the down-shift lines, so that the automatic transmission is shifted down from a higher-speed stage to a lower-speed stage. Thus, the gear-shift stage is shifted down. Since the upward slope is a gentle slope, moreover, the vehicle speed rapidly increases. When the depression of the accelerator pedal is restored to the original depth by the driver, in response to the increase of the vehicle speed, therefore, one of the up-shift lines is then crossed by the shift point, so that the gear-shift stage of the automatic transmission is shifted up again to the higher-speed stage. Thus, also in this situation, the gear-shift stage of the transmission inevitably continues to be alternately shifted between the lower- and higher-speed stages, so that the running stability of the vehicle is lowered.

SUMMARY OF THE INVENTION

The object of this invention is to provide a gear shift control system of an automatic transmission, capable of reducing unnecessary shifting operations of the transmission by properly inferring the running state of a vehicle, so that the drive feeling can be improved without lowering the running stability of the vehicle.

The above object is achieved by a gear shift control system of an automatic transmission according to this invention, the gear shift control system comprising: load and speed detecting means for repeatedly detecting the load on an internal combustion engine and the speed of the vehicle; memory means stored with a plurality of shift lines, each of the shift lines divisively defining the region of each of gear-shift stages in accordance with the engine load and the vehicle speed; load tendency detecting means for obtaining a tendency of transition of the engine load; speed tendency detecting means for obtaining a tendency of transition of the vehicle speed; inference means for inferring the running state of the vehicle from the respective transition tendencies of the engine load and the vehicle speed and obtaining a decision value as a result of the inference; correction means for determining a change of the shift line and an amount of the change in accordance with the decision value; and shift means for delivering a shift command signal to the automatic transmission when one of the shift lines, which is determined by said correction means, is crossed by a representative point, which is obtained from said load and speed detecting means for detecting the engine load and the vehicle speed, and indicates the driving conditions of the vehicle, the shift command signal corresponding to the region of that gear-shift stage on the side to which the representative point is moved, whereby the gear-shift stage of the automatic transmission is switched in accordance to the shift command signal when the shift command signal is received by the automatic transmission.

According to the gear shift control system described above, the shift command signal cannot be immediately delivered to the automatic transmission even when the representative point or the shift point, which is determined by the vehicle speed and the engine load, moves across any of the shift lines. Thus, when the shift line is crossed by the shift point, according to the gear shift control system of this invention, the running state of the vehicle is inferred from the respective tendencies of transition of the engine load and the vehicle speed obtained at this point of time, and then the decision value indicative of the running state of the vehicle is obtained as a result of this inference. Based on this decision value, it is determined whether or not part of the shift lines should be changed. If it is then concluded that the shift lines should be changed, the shift lines are corrected, and thereafter, it is determined again whether or not any of the corrected shift lines is crossed by the shift point. Based on the result of this determination, the shift command signal is delivered to the automatic transmission. If it is concluded by the decision value that the shift lines need not be corrected, on the other hand, it is determined whether or not the original shift lines are crossed by the shift point, as in the conventional case. Based on the result of this determination, the shift command signal is delivered to the automatic transmission.

Accordingly, the actual shifting operation of the automatic transmission is properly executed depending on the running state of the vehicle, so that undesired shifting operations of the transmission for the running state or hunting of the shifting operation can be prevented. Thus, both the running stability and drive feeling of the vehicle can be improved.

In inferring the running state, the decision value can be obtained by using the fuzzy theory.

The present invention will become more fully understood from the detailed description given hereinbelow and the accompanying drawings which are given by way of illustration only, and thus are not limitative of the present invention, and wherein:

DETAILED DESCRIPTION OF THE PREFERRED EMBODIMENTS

Figure 1:
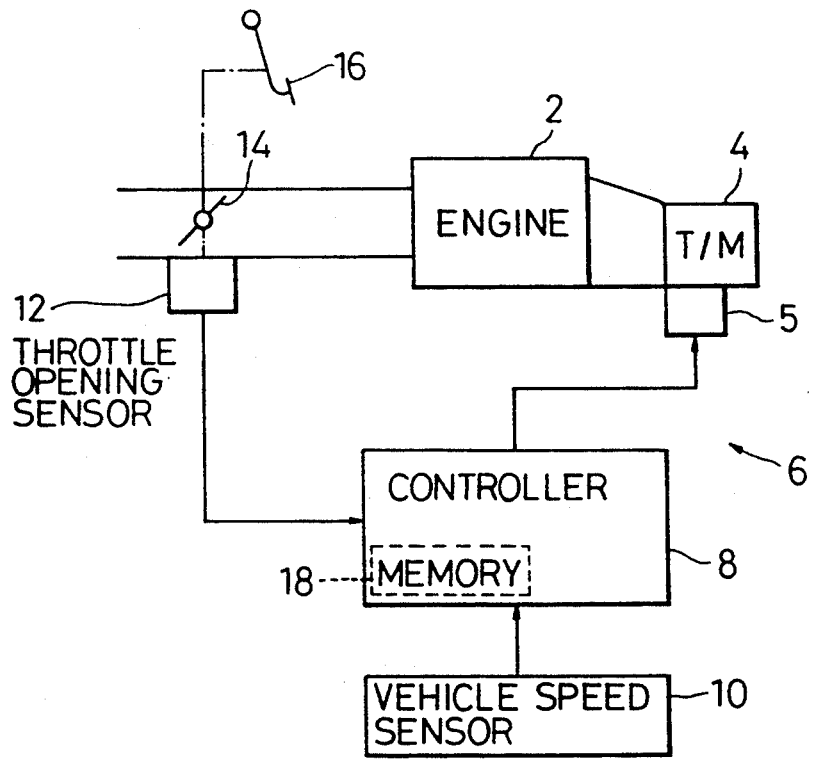
FIG. 1 is a schematic view showing an arrangement of a gear shift control system according to one embodiment of this invention.

Referring now to FIG. 1, there is schematically shown an automatic transmission 4 which is combined with an engine 2 of a vehicle. The automatic transmission 4 is used to shift up or down the gear-shift stage in response to a command signal from a gear shift control system 6. More specifically, the command signal for up- or down-shift is delivered from a controller 8 of the control system 6 to a hydraulic control unit 5 of the automatic transmission 4.

The controller 8 outputs the command signal in accordance with the vehicle speed and the load or throttle opening of the engine 2. To attain this, the controller 8 is connected electrically to a vehicle speed sensor 10 and a throttle opening sensor 12, and a vehicle speed V and a throttle opening $\theta$ detected by the vehicle speed sensor 10 and the throttle opening sensor 12, respectively, are supplied to the controller 8. The throttle opening sensor 12 is used to detect the valve opening or throttle opening $\theta$ of a throttle valve 14 in an intake passage, which leads to the engine 2. The throttle valve 14 is operated as an accelerator pedal 16 of the vehicle when the throttle valve 14 is depressed.

The controller 8 has a memory 18 built-in. The memory 18 is previously stored with mapped versions of up- and down-shift lines which are defined by the vehicle speed V and the throttle opening $\theta$. If the automatic transmission 4 has four forward-drive gear-shift stages, the memory 18 is stored with three up-shift lines and three down-shift lines.

Figure 2:
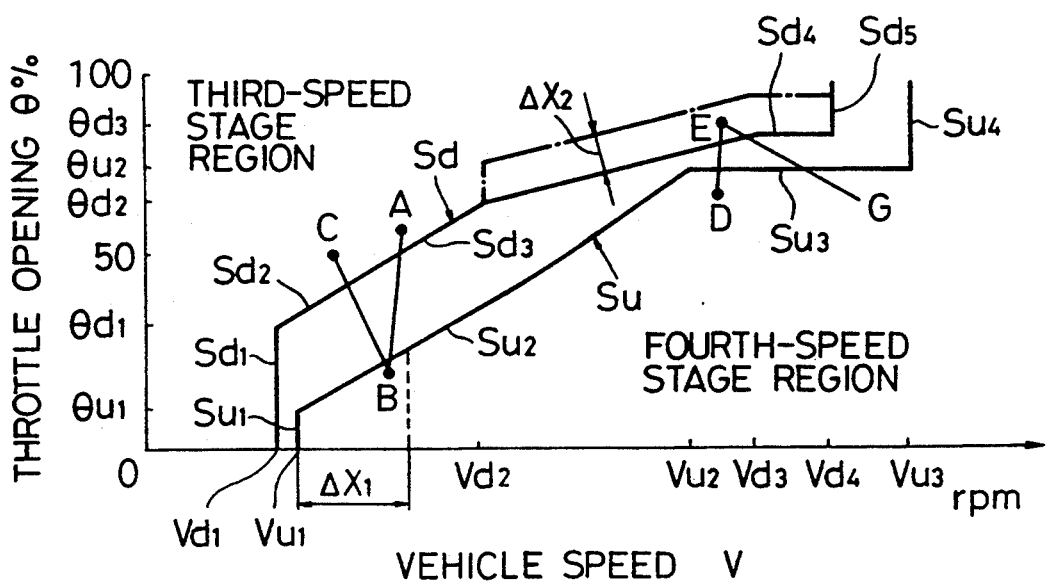
FIG. 2 is a graph showing an up-shift line and a down-shift line defined by the vehicle speed and throttle opening.

FIG. 2 shows an up-shift line $S_u$ and a down-shift line $S_d$. The axes of abscissa and ordinate of FIG. 2 represent the vehicle speed V and the throttle opening $\theta$, respectively. The up-shift line $S_u$ is provided to shift up the gear-shift stage of the automatic transmission 4 from a third-speed stage to a fourth-speed stage, for example. On the other hand, the down-shift line $S_d$ is provided to shift down the gear-shift stage from the fourth-speed stage to the third-speed stage. Thus, FIG. 2 is divided into two regions, a third-speed stage region on the left-hand side and a fourth-speed stage region on the right-hand side, by the up- and down-shift lines $S_u$ and $S_d$.

In the case of this embodiment, the up-shift line $S_u$ includes four sections $S_{u1}$, $S_{u2}$, $S_{u3}$, and $S_{u4}$. The section $S_{u1}$ vertically rises until the throttle opening reaches $\theta_{u1}$ with the vehicle speed at a predetermined value $V_{u1}$. The section $S_{u2}$ rises at a predetermined gradient as the vehicle speed and throttle opening increase from $V_{u1}$ and $\theta_{u1}$ to $V_{u2}$ and $\theta_{u2}$, respectively. The section $S_{u3}$ horizontally extends as the vehicle speed increases from $V_{u2}$ to $V_{u3}$ with the throttle opening kept at $\theta_{u2}$. The section $S_{u4}$ vertically rises with the vehicle speed over $V_{u3}$.

On the other hand, the down-shift line $S_d$ includes five sections $S_{d1}$, $S_{d2}$, $S_{d3}$, $S_{d4}$, and $S_{d5}$. The section $S_{d1}$ vertically rises until the throttle opening reaches $\theta_{d1}$ ($\theta_{d1} > \theta_{u1}$) with the vehicle speed at a predetermined value $V_{d1}$ ($V_{d1} < V_{u1}$). The section $S_{d2}$ rises at a predetermined gradient as the vehicle speed and throttle opening increase from $V_{d1}$ and $\theta_{d1}$ to $V_{d2}$ and $\theta_{d2}$ ($V_{u1} < V_{d2} < V_{u3}$, $\theta_{d2} < \theta_{u2}$), respectively. The section $S_{d3}$ rises at a gradient smaller than that of the section $S_{d2}$ as the vehicle speed and throttle opening increase from $V_{d2}$ and $\theta_{d2}$ to $V_{d3}$ and $\theta_{d3}$ ($V_{u2} < V_{d3} < V_{u3}$, $\theta_{d3} > \theta_{u2}$), respectively. The section $S_{d4}$ horizontally extends as the vehicle speed increases from $V_{d3}$ to $V_{d4}$ ($V_{d4} < V_{u3}$) with the throttle opening kept at $\theta_{d3}$ ($\theta_{u2} < \theta_{d3}$). The section $S_{d5}$ vertically rises with the vehicle speed over $V_{d4}$.

Thus, when the controller 8 is supplied with an actual vehicle speed $V_a$ and an actual throttle opening $\theta_a$ detected by means of the vehicle speed sensor 10 and the throttle opening sensor 12, respectively, it obtains a shift point which is determined by the actual vehicle speed $V_a$ and throttle opening $\theta_a$, and it is determined whether or not the up-shift line $S_u$ or down-shift line $S_d$ is crossed by this shift point. If the result of this decision is YES, that is, if it is concluded that the line $S_u$ or $S_d$ is crossed by the shift point moving in a predetermined direction, the controller 8 is allowed to output a command signal corresponding to the gear-shift stage on the side to which the shift point is moved, that is, a command signal for up or down shift.

In the gear shift control system for an embodiment of this invention, however, the controller 8 never unconditionally outputs the command signal for shift operation when the up-shift line $S_u$ or down-shift line $S_d$ is crossed by the shift point.

More specifically, the controller 8 first infers the running state of the vehicle when one of the shift lines is crossed by the shift point. The running conditions of the vehicle include the conditions of a road on which the vehicle runs, the driving conditions of the vehicle, and a driver's mental state. These conditions are inferred by means of the controller 8 on the basis of the fuzzy theory using tendencies of transition of the throttle opening $\theta$, acceleration of the vehicle speed V, etc. as parameters. Based on the result of this inference, the controller 8 determines a gear-shift stage best suited for the current running state.

Figure 3:
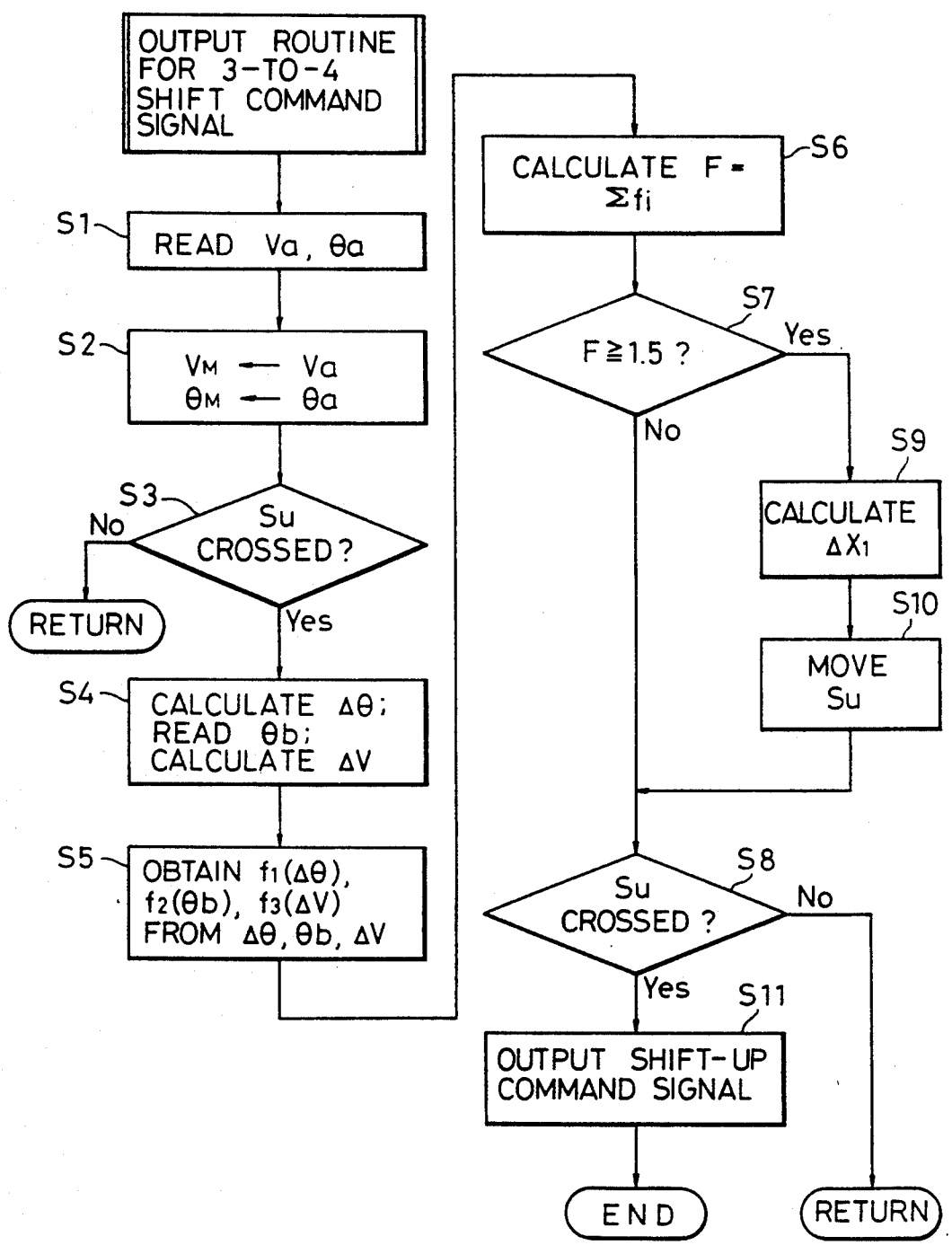
FIG. 3 is a flow chart showing an output routine for outputting a 3-to-4 shift command signal.
Figure 4:
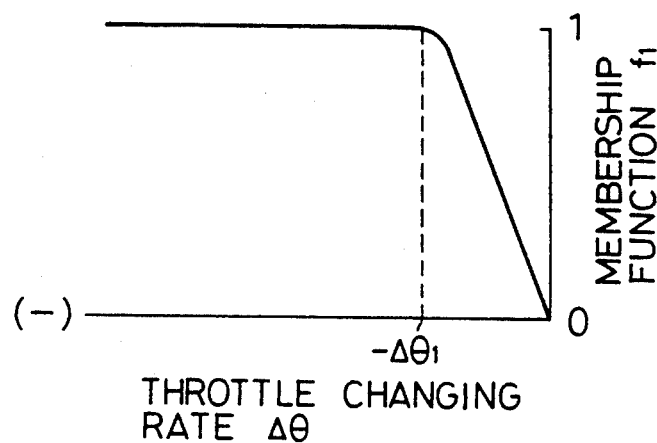
FIG. 4 is a graph showing the relationship between a throttle changing rate $\Delta\theta$ and a membership function $f_1$.
Figure 5:
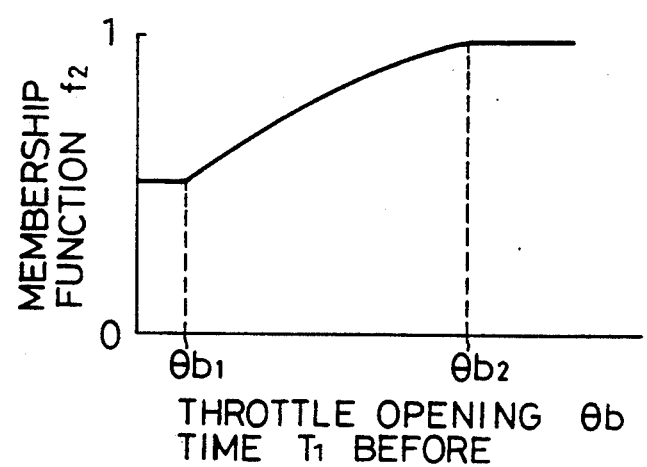
FIG. 5 is a graph showing the relationship between a throttle opening $\theta b$ and a membership function $f_2$.
Figure 6:
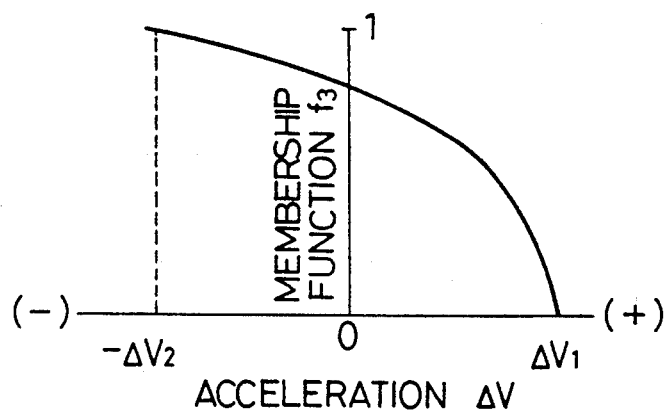
FIG. 6 is a graph showing the relationship between an acceleration $\Delta V$ and a membership function $f_3$.

Referring to FIG. 3, there is shown an output routine for a 3-to-4 shift command signal. FIGS. 4 to 6 individually show membership functions for the fuzzy theory carried out according to the output routine of FIG. 3.

The output routine for the 3-to-4 shift command signal will now be described with reference to the flow chart of FIG. 3.

3-to-4 Shift Command Signal Output Routine

In executing this output routine, it is supposed that the third-speed stage is selected as the gear-shift stage of the automatic transmission 4, and the vehicle is running in this state. This output routine is repeatedly executed with every predetermined control cycle.

First, in Step S1, the actual vehicle speed $V_a$ and the actual throttle opening $\theta_a$, detected by means of the vehicle speed sensor 10 and the throttle opening sensor 12, respectively, are read individually. The actual vehicle speed $V_a$ and the actual throttle opening $\theta_a$ are stored, respectively, in the memory 18 or buffers $V_M$ and $\theta_M$ in the controller 8 in Step S2, and are then used for the decision in Step S3.

The buffers $V_M$ and $\theta_M$, which can successively store data, that is, the actual vehicle speed $V_a$ and the actual throttle opening $\theta_a$ read one after another, can hold data in time $t_1$ (e.g., 2 sec). When the respective storage capacities of the buffers $V_M$ and $\theta_M$ are used up, therefore, new data can be overwrote on the oldest data in the buffers.

In Step S3, it is determined whether or not the up-shift line $S_u$ is crossed by the shift point which can be obtained according to the actual vehicle speed $V_a$ and the actual throttle opening $\theta_a$. Immediately after this output routine is executed, the third-speed stage is selected as the gear-shift stage of the automatic transmission 4, as mentioned before, so that the shift point is within the third-speed stage region on the left-hand side of FIG. 2, and is defined by the up-shift line $S_u$. Accordingly, the result of decision in Step S3 at this point of time is NO, so that the program returns to Step S1. Unless the result of decision in Step S3 turns to YES, therefore, the steps from Step S1 to Step S3 are only repeatedly executed.

If the depth of depression of the accelerator pedal 16 is reduced in this state, for example, the actual throttle opening $\theta_a$ decreases. When the up-shift line $S_u$ of FIG. 2 is crossed by the shift point, therefore, the result of the decision in Step S3 becomes YES.

In the next step or Step S4, the changing rate $\Delta\theta$ of the throttle opening $\theta$ at that time, the throttle opening $\theta_b$ detected at the time $t_1$ before, and the change or acceleration $\Delta V$ of the vehicle speed V observed during the time interval between the time $t_1$ before and the time $t_2$ (e.g., 1 sec) after are obtained individually.

The throttle changing rate $\Delta\theta$ and the acceleration $\Delta V$ can be individually calculated according to the following equations:

$$\Delta\theta = \theta_n - \theta_{n-1},$$

$$\Delta V = V_n - V_b.$$

In these equations, $\theta_{n-1}$ is the throttle opening read when the preceding control cycle is executed, $\theta_n$ is the throttle opening $\theta$ read when the present control cycle is executed, $V_b$ is the vehicle speed at the point of time $t_1$ before, and $V_n$ is the vehicle speed V detected at the point of time in which time $t_2$ lapsed as observed from the point of time $t_1$.

Here $V_n$, $V_b$, $\theta_{n-1}$, $\theta_n$ and $\theta_b$ can be obtained from the data stored in the buffers $V_M$ and $\theta_M$.

In the next step or Step S5, the respective values of membership functions $f_1$, $f_2$ and $f_3$ are individually calculated with use of the calculated values of $\Delta\theta$, $\theta_b$ and $\Delta V$ as variables. These values of the membership functions indicate degrees of which the up-shift line $S_u$ should be corrected without doubt. The functions $f_1$, $f_2$ and $f_3$ are illustrated in FIGS. 4, 5 and 6, respectively.

The characteristic curve of FIG. 4, which represents the membership function $f_1$, includes a section in which the function value gradually increases from 0 toward 1 as the throttle changing rate is lowered to $-\Delta\theta_1$, and a section in which the function value is kept at the maximum value 1 even though the throttle changing rate further drops below $-\Delta\theta_1$, in the region where the throttle changing rate $\Delta\theta$ takes a negative value.

The characteristic curve of FIG. 5, which represents the membership function $f_2$, includes a section in which the function value is kept at, for example, 0.5 or thereabout, in the region where the throttle opening $\theta_b$ is not greater than $\theta_{b1}$, a section in which the function value gradually increases as the throttle opening $\theta_b$ increases from $\theta_{b1}$ toward $\theta_{b2}$, and a section in which the function value is kept at the maximum value 1 even though the throttle opening $\theta_b$ is $\theta_{b2}$ or more.

The characteristic curve of FIG. 6, which represents the membership function $f_3$, includes a section in which the function value is reduced from a predetermined value between, for example, 1 and 0.5 as the acceleration $\Delta V$ positively increases from 0, and is reduced to 0 when the acceleration $\Delta V$ is at $\Delta V_1$ or more, and a section in which the function value gradually increases from the predetermined value between 1 and 0.5 as the acceleration $\Delta V$ negatively increases, and takes the maximum value 1 when the acceleration $\Delta V$ is at $-\Delta V_2$ or less.

More specifically, the membership functions $f_1$, $f_2$ and $f_3$, like the up-shift line $S_u$ and the down-shift line $S_d$, are mapped and previously stored in the memory 18 of the controller 8. In step S5, therefore, the respective values of the membership functions, that is, $f_1(\Delta\theta)$, $f_2(\theta_b)$ and $f_3(\Delta V)$, are obtained on the basis of the values $\Delta\theta$, $\theta_b$ and $\Delta V$ obtained in Step S4.

In the next step or Step S6, the respective values $f_1(\Delta\theta)$, $f_2(\theta_b)$ and $f_3(\Delta V)$ of the membership functions are added together, that is, the sum total of these function values is obtained. In this embodiment, the individual function values are multiplied by predetermined weighting factors $k_1$, $m_1$ and $n_1$ when they are added up.

The sum total of the function values represents a decision value F indicative of the result of inference of the running state of the vehicle. This decision value F can be calculated according to the following equation:

$$F = \Sigma f_i = k_1 \cdot f_1(\Delta\theta) + m_1 \cdot f_2(\theta_b) + n_1 \cdot f_3(\Delta V),$$

where the weighting factors $k_1$, $m_1$ and $n_1$ take positive values ranging, for example, from 0 to 1. These values can be set as required.

In the next step or Step S7, it is determined whether or not the calculated decision value F is not smaller than, for example, 1.5. If the result of this decision at Step S7 is NO, the program proceeds directly to Step S8. If this decision result at Step S7 is YES, on the other hand, the program proceeds to Step S8 via Steps S9 and S10.

If the result of decision in Step S7 is YES, that is, if the decision value F is not smaller than 1.5, the following running states of the vehicle can be supposed, as seen from FIGS. 4 to 6.

In a first running state, the acceleration $\Delta V$ takes a small positive value even though the throttle opening $\theta_b$ for the time $t_1$ before is great. In this case, the vehicle can be supposed to be ascending a steep slope.

In a second running state, the throttle opening $\theta_b$ is not smaller than a moderate opening, and the throttle changing rate $\Delta\theta$ takes a great negative value (in the case where the accelerator pedal 16 is not depressed). In this case, the vehicle can be supposed to have encountered an obstacle, such as a traffic jam, wait for a signal, wild plunge of a pedestrian or another vehicle, etc., while the vehicle it is running along the streets of a town.

Figure 7:
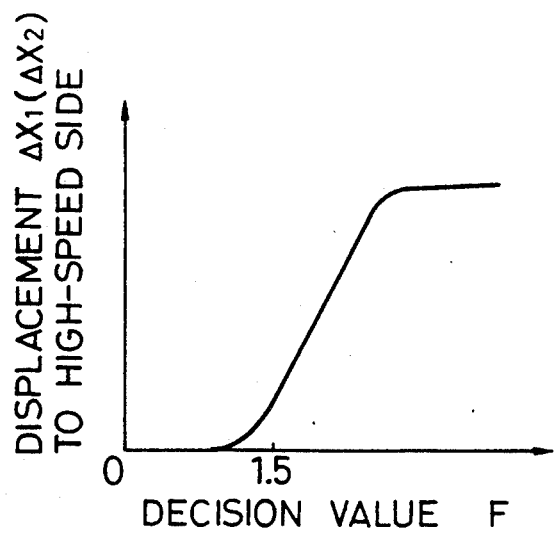
FIG. 7 is a graph showing the relationship between a decision value F and a displacement $\Delta X_1(\Delta X_2)$.

If the result of decision in Step S7 is YES, a displacement $\Delta X_1$ is determined on the basis of the decision value F in Step S9. The displacement $\Delta X_1$ is a value which indicates the degree of displacement of part of the up-shift line $S_u$, that is, a low-speed section, to the high-speed region side. More specifically, the displacement $\Delta X_1$ is obtained in accordance with the decision value F, as illustrated in the map of FIG. 7. Preferably, the value of the displacement $\Delta X_1$ is restricted to prevent the engine brake from being worked in a situation such that the gear-shift stage of the automatic transmission 4 is kept at the third-speed stage. As seen from FIG. 7, the characteristic curve which determines the displacement $\Delta X_1$ takes a predetermined value when the decision value F is 1.5, and its value increases toward its maximum value as the decision value F increases.

In the next step or Step S10, the low-speed section of the up-shift line $S_u$ is moved to the high-speed region side in accordance with the displacement $\Delta X_1$ obtained in the preceding step. Various methods may be used to move the low-speed section, that is, to correct the up-shift line $S_u$. In the case of this embodiment, the up-shift line $S_u$ is corrected in a manner such that the low-speed section of the line $S_u$ is cut, as indicated by broken line in FIG. 2. This correction causes, for example, the value $V_{uL}$ of FIG. 2 to increase from 30 km/h to 50 km/h.

In Step S8, as in the case of the decision in Step S3, it is determined whether or not the up-shift line $S_u$ is crossed by the shift point which can be obtained according to the actual vehicle speed $V_a$ and the actual throttle opening $\theta_a$ read in Step S1. The up-shift line $S_u$ used in this decision may be either the one corrected in Step S10 or the one kept without change.

If the result of the decision in Step S8 is YES, a shift-up command signal is delivered from the controller 8 to the automatic transmission 4 in the next step or Step S11, whereupon the gear-shift stage of the automatic transmission 4 is shifted from the third-speed stage to the fourth-speed stage. If the result of decision in Step S8 is NO, on the other hand, the program returns to Step S1, and by-passes Step S11.

According to the output routine for the 3-to-4 shift command signal, when the accelerator pedal 16 is released from the depression by the driver so that the actual throttle opening $\theta_a$ is considerably reduced, the shift point, which is determined by the actual throttle opening $\theta_a$ and the actual vehicle speed $V_a$, moves from a position A to a position B of FIG. 2. In this case, the result of decision in Step S3 is YES. At this point of time, however, the shift-up command cannot be outputted immediately from the controller 8, and Steps S3 and S4 and the following steps are executed.

Figure 8:
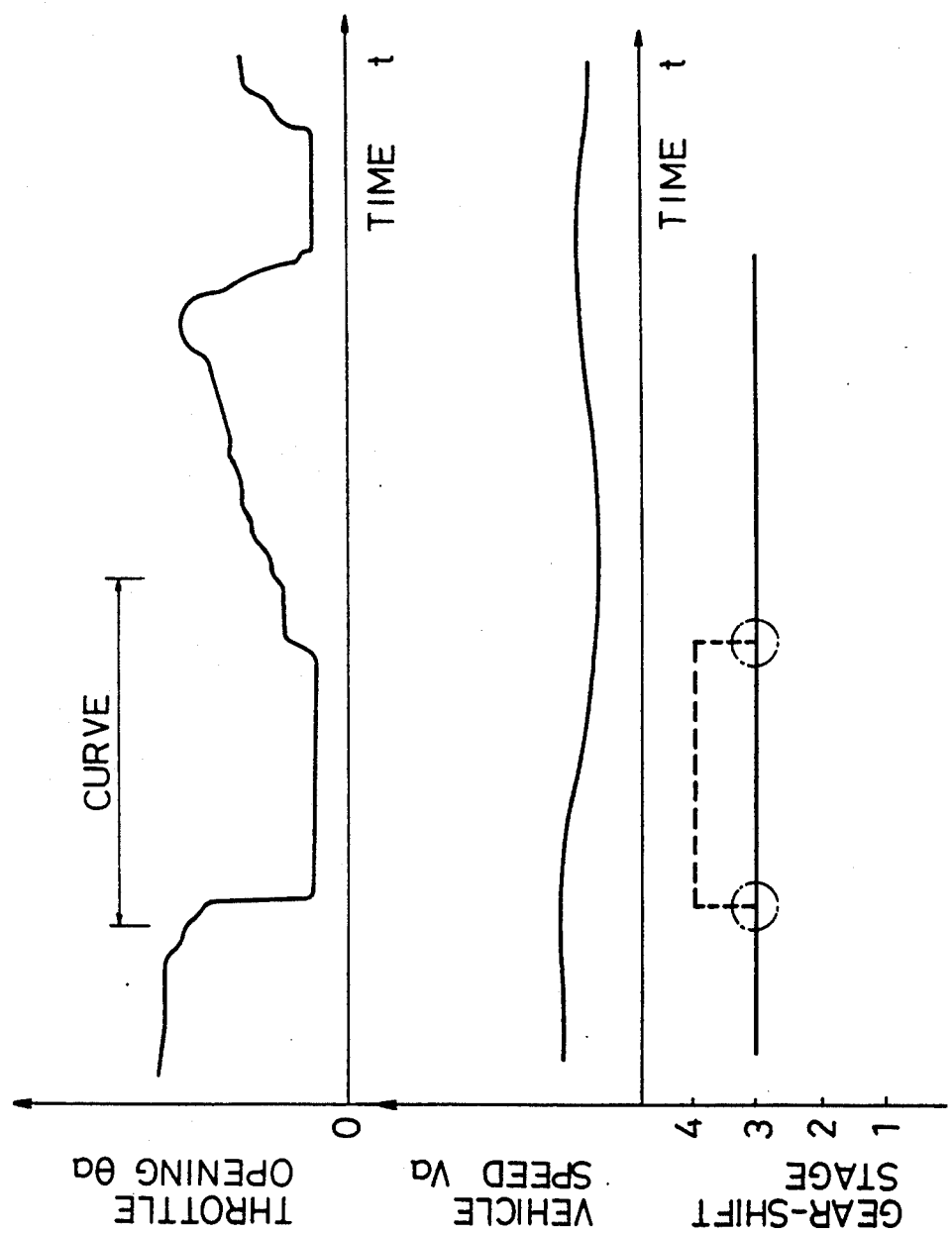
FIG. 8 is a graph showing time-based transitions of the throttle opening, vehicle speed, and gear-shift stage.

If the result of the decision in Step S7 is YES, thereafter, it can be concluded that the vehicle has entered a curve, as shown in FIG. 8, while ascending a steep slope, or the vehicle has encountered the aforesaid obstacle while running along the streets. In such a running state, therefore, the low-speed section of the up-shift line $S_u$ is corrected in the aforesaid manner in Step S10, on the basis of the displacement $\Delta X_1$ calculated in Step S9.

When the program proceeds from Step S10 to Step S8, it is determined whether or not the up-shift line $S_u$ is crossed by the shift point, as in the case of the decision in Step S3. However, the up-shift line $S_u$ used in this decision is already corrected, as indicated by the broken line in FIG. 2. Although the shift point is moved to the aforesaid position B, therefore, the up-shift line $S_u$ is not crossed by the shift point, so that the result of decision is Step S8 is NO, and in this case, Step S11 is not executed. In the running state described above, the shift-up command signal cannot be outputted, so that the automatic transmission 4 can be prevented from being unexpectedly shifted up.

Thereafter, when the accelerator pedal 16 is depressed again by the driver as the vehicle reaches the middle or end of a curve while rounding the curve, or as the aforesaid obstacle is removed while the vehicle is running along the streets, the shift point may be possibly moved from the position B to a position C of FIG. 2. In this case, the down-shift line $S_d$ is crossed by the shift point. Since the gear-shift stage of the automatic transmission 4 is kept at the third-speed stage, however, the automatic transmission 4 can be also prevented from being unexpectedly shifted down.

In the running state described above, the gear-shift stage of the automatic transmission 4 can be kept at the third-speed stage without being shifted up to the fourth-speed stage.

In the conventional case, in contrast with this, when the shift point moves from the position A to the position B to cross the up-shift line $S_u$, as shown in FIG. 2, as the accelerator pedal 16 is released from the depression by the driver, the shift-up command signal is outputted at once. In this case, therefore, the gear-shift stage of the automatic transmission 4 is shifted up from the third-speed stage to the fourth-speed stage, as indicated by the broken line in FIG. 8. When the accelerator pedal 16 is depressed thereafter by the driver so that the shift point moves from the position B to the position C (or position A), the down-shift line $S_d$ is crossed by the shift point. In this case, therefore, a shift-down command signal is delivered from the controller 8, so that the gear-shift stage of the automatic transmission 4 is shifted down from the fourth-speed stage to the third-speed stage.

Thus, in the conventional case, when the vehicle reaches an entrance or exit of a curve as the vehicle ascends a slope, for example, the gear-shift stage is inevitably and repeatedly shifted up and down, as indicated by the broken-line circles in FIG. 8.

Referring now to the flow chart of FIG. 9 and the maps of FIGS. 10 to 12, an output routine for outputting a 4-to-3 shift command signal will be described.

4-to-3 Shift Command Signal Output Routine

Figure 9:
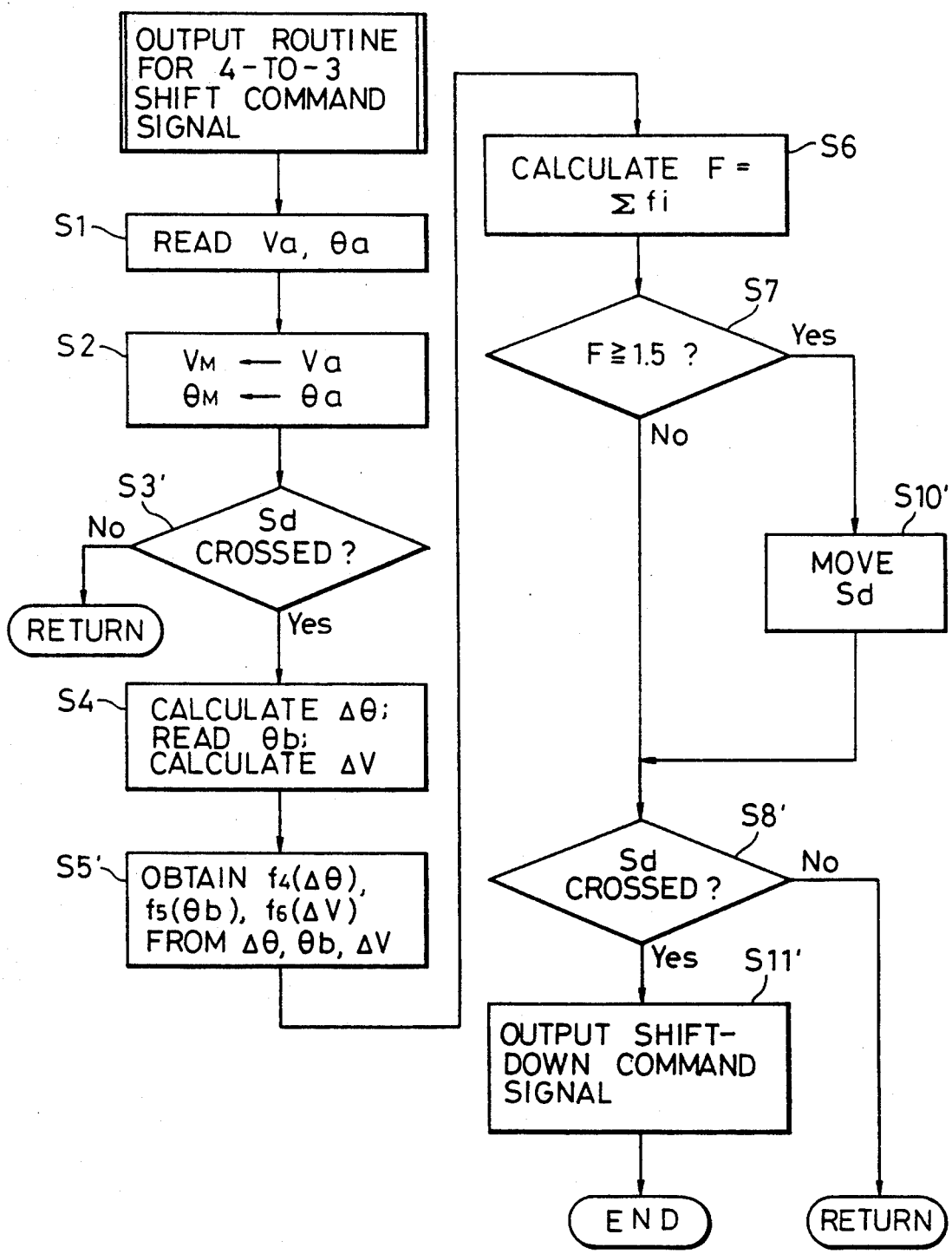
FIG. 9 is a flow chart showing an output routine for outputting a 4-to-3 shift command signal.

In the description of the flow chart of FIG. 9 to follow, like step numbers are used to designate the same steps as in FIG. 3, and a description of those steps is omitted. Further, those steps of FIG. 9 which have their counterparts in FIG. 3 are designated by corresponding step numbers with primes.

When the output routine of FIG. 9 is executed, the fourth-speed stage is selected as the gear-shift stage of the automatic transmission 4. In Step S3', therefore, it is determined whether or not the shift point, which can be obtained according to the actual vehicle speed $V_a$ and the actual throttle opening $\theta_a$, is moved from the fourth-speed stage region to the third-speed stage region across the down-shift line $S_d$.

If the result of the decision in Step S3' is YES, the program proceeds to Step S5' via Step S4. In Step S5', the respective values of membership functions $f_4$, $f_5$ and $f_6$ are calculated in place of those of the aforesaid membership functions $f_1$, $f_2$ and $f_3$.

Figure 10:
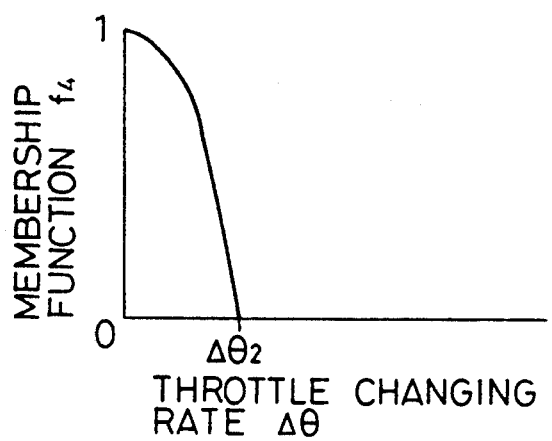
FIG. 10 is a graph showing the relationship between the throttle changing rate $\Delta\theta$ and a membership function $f_4$.

As shown in FIG. 10, a characteristic curve which represents the membership function $f_4$ includes a section in which the function value takes the maximum value 1 when the throttle changing rate $\Delta\theta$ is 0 and decreases as the throttle changing rate $\Delta\theta$ positively increases, and a section in which the function value is kept at 0 in the region where the throttle changing rate is $\Delta\theta_2$ or more.

Figure 11:
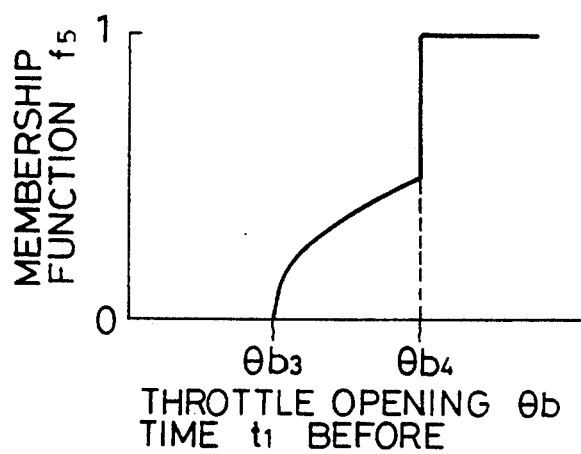
FIG. 11 is a graph showing the relationship between the throttle opening $\theta b$ and a membership function $f_5$.

As shown in FIG. 11, a characteristic curve which represents the membership function $f_5$ includes a section in which the function value is kept at 0 before the throttle opening $\theta_b$ reaches $\theta_{b3}$, a section in which the function value increases toward, for example, 0.5 as the throttle opening $\theta_b$ increases from $\theta_{b3}$ toward $\theta_{b4}$, and a section in which the function value is kept at the maximum value 1 in the region where the throttle opening $\theta_b$ is $\theta_{b4}$ or more.

Figure 12:
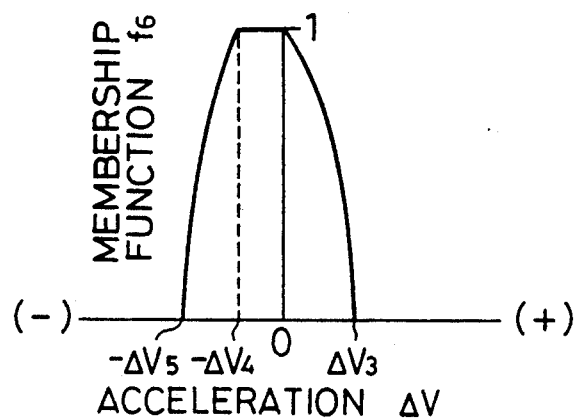
FIG. 12 is a graph showing the relationship between the acceleration $\Delta V$ and a membership function $f_6$.

As shown in FIG. 12, a characteristic curve which represents the membership function $f_6$ includes a section in which the function value is kept at the maximum value 1 while the acceleration $\Delta V$ varies between $-\Delta V_4$ and 0, a section in which the function value decreases as the acceleration $\Delta V$ increases toward $\Delta V_3$, a section in which the function value is kept at 0 in the region where the acceleration $\Delta V$ is at $\Delta V_3$ or more, a section in which the function value decreases as the acceleration $\Delta V$ decreases from $-\Delta V_4$ toward $-\Delta V_5$, and a section in which the function value is kept at 0 in the region where the acceleration $\Delta V$ is at $-V$ is at $-\Delta V_5$ or less.

When the respective values of the membership functions $f_4$, $f_5$ and $f_6$, that is, $f_4(\Delta\theta)$, $f_5(\theta_b)$ and $f_6(\Delta V)$ are obtained in Step S5', the decision value F is calculated according to the following equation in the next step or Step S6'.

$$F = \Sigma f_1 = k_2 \cdot f_4(\Delta\theta) + m_2 \cdot f_5(\theta_b) + n_2 \cdot f_6(\Delta V),$$

where $k_2$, $m_2$ and $n_2$ are weighting factors, which are also set at proper values ranging from 0 to 1.

If the result of decision in Step S7 is YES, Step S10' is then executed. In this step, part of the down-shift line $S_d$, that is, a high-speed section, is corrected as indicated by the dashed line in FIG. 2. In the case of this embodiment, the high-speed section of the down-shift line $S_d$ covers a region between $V_{d2}$ and $V_{d4}$ in terms of the vehicle speed V, and is translated for a predetermined displacement $\Delta X_2$ in terms of the throttle opening $\theta$ by the aforesaid correction.

Although the displacement $\Delta X_2$ is set as a fixed value in this case, the displacement $\Delta X_2$ may alternatively be set as a variable value which can vary depending on the decision value F, as in the case of the aforesaid displacement $\Delta X_1$. In this case, the displacement $\Delta X_2$ can be obtained according to the decision value F, based on the same graph as that of FIG. 7 except that the axis of ordinate represents the displacement $\Delta X_2$ in place of the displacement $\Delta X_1$.

Step S7 or S10' is followed by Steps S8' and S11' in succession. In Step S8', in this case, it is determined whether or not the corrected or original down-shift line $S_d$ is crossed by the shift point which is determined by the actual vehicle speed $V_a$ and the actual throttle opening $\theta_a$. If the result of this decision is YES, the shift-down command signal is delivered to the automatic automatic transmission 4 in Step S11', whereupon the gear-shift stage of the transmission 4 is shifted down from the fourth-speed stage to the third-speed stage.

According to the 4-to-3 shift command signal output routine described above, when the shift point moves from a position D to a position E of FIG. 2, the result of the decision in Step S3' turns to YES, whereupon Step S4 and its subsequent steps are executed. If the result of the decision in Step S7 is YES, then the throttle opening $\theta_b$ is not smaller than a moderate opening, the acceleration $\Delta V$ is nearly 0, and the throttle changing rate $\Delta\theta$ takes a relatively small positive value, as seen from FIGS. 10 to 12. This indicates that the vehicle is hardly subject to any acceleration although the accelerator pedal 16 is softly depressed by the driver.

Thus, if the result of the decision in Step S7 is YES, it can be concluded that the vehicle has come to a gentle upward slope while running at a relatively high speed. In such a running state, an increase of the driving force of the engine 2 is balanced with an increase of the running resistance to the vehicle, which is attributable to the inclination of the slope. In this case, if the high-speed section of the down-shift line $S_d$ is moved for the predetermined displacement $\Delta X_2$ in Step S10', as mentioned before, the corrected down-shift line $S_d$ is not crossed by the position E of the shift point, so that the result of the decision in Step S8' executed next is NO. In the running state described above, therefore, the shift-down command signal cannot be delivered from the controller 8 even though the shift point moves from the position D to the position E. Accordingly, the gear-shift stage of the automatic transmission 4 can be kept at the fourth-speed stage, and can be prevented from being unexpectedly shifted down.

When the vehicle finishes ascending the gentle slope, thereafter, the vehicle starts to be accelerated, so that the driver reduces the depression of the accelerator pedal 16. Sometimes, therefore, the shift point may move from the position E to a position G, thereby crossing the up-shift line $S_u$. In this case, however, the gear-shift stage of the automatic automatic transmission 4 is kept at the fourth-speed stage, so that the transmission 4 cannot be shifted up.

In the conventional case, in contrast with the above-described case, the gear-shift stage of the automatic transmission 4 is immediately shifted down from the fourth-speed stage to the third-speed stage when the shift point is moved from the position D to the position E, as mentioned before. In consequence, the actual vehicle speed $V_a$ increases, so that the accelerator pedal 16 is released from the depression. Thereupon, the shift point moves from the position E to the position G, and thereby crosses the up-shift line $S_u$. As a result, the gear-shift stage of the automatic transmission 4 is immediately shifted up from the three-speed stage to the fourth-speed stage. In the conventional case, therefore, the shifting operation of the transmission 4 suffers an undesired hunting. In the case of this invention, unexpected shifts down from the fourth-speed stage to the third-speed stage can be prevented, so that the undesired hunting can be effectively prevented.

In either of the 3-to-4 and 4-to-3 shift command signal output routines of this invention, the up- and down-shift lines $S_u$ and $S_d$ are only partially corrected in response to the result of the decision in Step S7. In a normal running state, therefore, the gear-shift stage can be shifted up and down by using the respective regions of the uncorrected or original up- and down-shift lines $S_u$ and $S_d$, without producing a sense of incompatibility. Even in each output routine, the up- and down-shift lines $S_u$ and $S_d$ cannot be corrected unless the requirements are fulfilled. Thus, in a kick-down mode which requires a down shift, or in a running state which entails substantial acceleration or deceleration, for example, the automatic transmission 4 can execute the normal shifting operation.

This invention is not limited to the embodiment described above, and various modifications may be effected therein. According to the above-described embodiment, for example, the up- and down-shift lines $S_u$ and $S_d$ are defined by the vehicle speed V and the throttle opening $\theta$. However, the vehicle speed V may be replaced with the transfer drive gear rotating speed of the automatic transmission 4, which substantially corresponds to the vehicle speed, so that the shift lines $S_u$ and $S_d$ can be defined individually by the rotating speed and the throttle opening $\theta$.

Further, the way of displacement or correction of the low- and high-speed sections of the up- and down-shift lines $S_u$ and $S_d$ is not limited to the example shown in FIG. 2.

According to the embodiment described herein, furthermore, the gear-shift stage of the automatic transmission 4 is shifted between the third- and fourth-speed stages. It is to be understood, however, that the gear shift control system of this invention may be also applied to a shift between any other gear-shift stages.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear shift control system for an automatic transmission, said automatic transmission having a plurality of gear-shift stages and being combined with an internal combustion engine mounted in a vehicle, said gear shift control system comprising:

load and speed detecting means for repeatedly detecting the load on the engine and the speed of the vehicle;

memory means stored with a plurality of shift lines, each said shift line divisively defining the region of each gear-shift stage in accordance with the engine load and the vehicle speed;

load tendency detecting means for obtaining a tendency of transition of the engine load;

speed tendency detecting means for obtaining a tendency of transition of the vehicle speed;

inference means for inferring the running state of the vehicle from the respective transition tendencies of the engine load and the vehicle speed and obtaining a decision value as a result of the inference;

correction means for determining a change of the shift lines and for determining an amount of the change, in accordance with the decision value; and shift means for delivering a shift command signal to the automatic transmission when one of the shift lines, which is determined by said correction means, is crossed by a representative point, which is obtained from said load and speed detecting means for detecting the engine load and the vehicle speed, and indicates the driving conditions of the vehicle, said shift command signal corresponding to the region of the gear-shift stage on the side to which the representative point is moved, whereby the gear-shift stage of the automatic transmission is switched in accordance to said shift command signal when said shift command signal is received by the automatic transmission.

2. A system according to claim 1, wherein said load tendency detecting means includes load differentiating means for differentiating the engine load to obtain the changing rate of the engine load, and past-state engine load determining means for obtaining, as a past-state engine load, the engine load detected at a predetermined time before the calculation of the changing rate of the engine load, and said speed tendency detecting means includes speed differentiating means for differentiating the vehicle speed to obtain the changing rate of the vehicle speed.

3. A system according to claim 2, wherein said inference means includes a first inference function using the changing rate of the engine load as a variable, a second inference function using the past-state engine load as a variable, and a third inference function using the changing rate of the vehicle speed as a variable, and said decision value is calculated as the sum total of the respective values of the inference functions.

4. A system according to claim 3, wherein said correction means changes the shift lines when the decision value attains a level that fails to be lower than a predetermined value.

5. A system according to claim 4, wherein said memory means includes, as one of the shift lines, an up-shift line for shifting the gear-shift stage of the automatic transmission from a low-speed stage to a high-speed stage, and said correction means determines whether a low-speed section of the up-shift line should be changed to the high-speed region side or the up-shift line should be maintained without change.

6. A system according to claim 5, wherein said correction means includes proportional generating means for making the displacement of the low-speed section of the up-shift line substantially proportional to the decision value that fails to be smaller than the predetermined value.

7. A system according to claim 6, wherein if the first inference function of said inference means is represented by a first characteristic curve, said first characteristic curve includes a first section in which the value of the first inference function increases from 0 to a maximum value as the changing rate of the engine load varies from 0 to a negative first predetermined value, and a second section in which the value of the first inference function is kept at the maximum value in the region where the changing rate takes a value smaller than the first predetermined value.

8. A system according to claim 6, wherein if the second inference function of said inference means is represented by a second characteristic curve, said second characteristic curve includes a first section in which the value of the second inference function is kept at a fist fixed value as the past-state engine load varies from 0 to a positive second predetermined value, a second section in which the value of the second inference function increases from the fist fixed value to the maximum value as the past-state engine load increases from the second predetermined value to a third predetermined value, and a third section in which the value of the second inference function is kept at the maximum value in the region where the past-state engine load exceeds the third predetermined value.

9. A system according to claim 6, wherein if the third inference function of said inference means is represented by a third characteristic curve, said third characteristic curve includes a first section in which the value of the third inference function decreases from a second fixed value to 0 as the changing rate of the vehicle speed varies from 0 to a positive fourth predetermined value, and a second section in which the value of the third inference function increases from the second fixed value to a maximum value as the changing rate of the vehicle speed varies from 0 to a negative fifth predetermined value.

10. A system according to claim 6, wherein if the first, second, and third inference functions of said inference means are represented by first, second, and third characteristic curves, respectively, said first characteristic curve includes,
   a first section in which the value of the first inference function increases from 0 to a maximum value as the changing rate of the engine load varies from 0 to a negative first predetermined value, and
   a second section in which the value of the first inference function is kept at the maximum value in the region where the changing rate takes a value smaller than the first predetermined value;
said second characteristic curve includes,
   a third section in which the value of the second inference function is kept at a first fixed value as the past-state engine load varies from 0 to a positive second predetermined value,
   a fourth section in which the value of the second inference function increases from said first fixed value to the maximum value as the past-state engine load increases from the second predetermined value to a third predetermined value, and
   a fifth section in which the value of the second inference function is kept at the maximum value in the region where the past-state engine load exceeds the third predetermined value; and
said third characteristic curve includes,
   a sixth section in which the value of the third inference function decreases from a second fixed value to 0 as the changing rate of the vehicle speed varies from 0 to a positive fourth predetermined value, and
   a seventh section in which the value of the third inference function increases from the second fixed value to the maximum value as the changing rate of the vehicle speed varies from 0 to a negative fifth predetermined value.

11. A system according to claim 4, wherein said memory means includes, as one of the shift lines, down-shift line for shifting the gear-shift stage of the automatic transmission from a high-speed stage to a low-speed stage, and said correction means determines whether a high-speed section of down-shift line should be changed to the high-load side of the engine load or the down-shift line should be maintained without change.

12. A system according to claim 11, wherein said correction means includes means for making the displacement of the high-speed section constant.

13. A system according to claim 1, wherein said correction means includes means for making the displacement of the high-speed section substantially proportional to the decision value.

14. A system according to claim 11, wherein if the first inference function of said inference means is represented by a fourth characteristic curve, said fourth characteristic curve includes a first section in which the value of the first inference function decreases from a maximum value to 0 as the changing rate of the engine load varies from 0 to a positive sixth predetermined value.

15. A system according to claim 11, wherein if the second inference function of said inference means is represented by a fifth characteristic curve, said fifth characteristic curve includes a first section in which the value of the second inference function is kept at 0 as the past-state engine load varies from 0 to a positive seventh predetermined value, a second section in which the value of the second inference function increases from 0 to a third fixed value as the past-state engine load increases from the seventh predetermined value to an eighth predetermined value, and a third section in which the value of the second inference function is kept at the maximum value in the region where the past-state engine load exceeds the eighth predetermined value.

16. A system according to claim 11, wherein if the third inference function of said inference means is represented by a sixth characteristic curve, said sixth characteristic curve includes a first section in which the value of the third inference function decreases from a maximum value to 0 as the changing rate of the vehicle speed varies from 0 to a positive eighth predetermined value, a second section in which the value of the third inference function is kept at the maximum value as the changing rate of the vehicle speed varies from 0 to a negative ninth predetermined value, and a third section in which the value of the third inference function decreases from the maximum value to 0 as the changing rate of the vehicle speed decreases from ninth predetermined value to a negative tenth predetermined value.

17. A system according to claim 11, wherein if the first, second, and third inference functions of said inference means are represented by fourth, fifth, and sixth characteristic curves, respectively, said fourth characteristic curve includes a first section in which the value of the first inference function decreases from a maximum value to 0 as the changing rate of the engine load varies from 0 to a positive sixth predetermined value; said fifth characteristic curve includes;

- a second section in which the value of the second inference function is kept at 0 as the past-state engine load varies from 0 to a positive seventh predetermined value,
- a third section in which the value of the second inference function increases to a third fixed value as the past-state engine load increases from the seventh predetermined value to an eighth predetermined value, and
- a fourth section in which the value of the second inference function is kept at the maximum value in the region where the past-state engine load exceeds the eighth predetermined value; and said sixth characteristic curve includes,

- a fifth section in which the value of the third inference function decreases from a maximum value to 0 as the changing rate of the vehicle speed varies from 0 to a positive eighth predetermined value,
- a sixth section in which the value of the third inference function is kept at the maximum value as the changing rate of the vehicle speed varies from 0 to a negative ninth predetermined value, and
- a seventh section in which the value of the third inference function decreases from the maximum value to 0 as the changing rate of the vehicle speed decreases from the negative ninth predetermined value to a negative tenth predetermined value.

* * * * *